(12) United States Patent  
Suzuki et al.

(10) Patent No.: US 9,337,498 B2
(45) Date of Patent: May 10, 2016

(54) FUEL CELL STACK

(71) Applicant: HONDA MOTOR CO., LTD., Tokyo (JP)

(72) Inventors: Masaharu Suzuki, Wako (JP); Kentaro Ishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 231 days.

(21) Appl. No.: 14/098,532

(22) Filed: Dec. 6, 2013

(65) Prior Publication Data
US 2014/0162163 A1  Jun. 12, 2014

(30) Foreign Application Priority Data

Dec. 10, 2012 (JP) .................................. 2012-269279

(51) Int. Cl.
*H01M 8/24* (2006.01)
*H01M 8/02* (2016.01)
*H01M 8/10* (2016.01)

(52) U.S. Cl.
CPC .......... *H01M 8/0247* (2013.01); *H01M 8/0258* (2013.01); *H01M 8/0265* (2013.01); *H01M 2008/1095* (2013.01); *Y02E 60/50* (2013.01)

(58) Field of Classification Search
None
See application file for complete search history.

(56) References Cited

U.S. PATENT DOCUMENTS 7,745,062 B2 * 6/2010 Sugiura ............... H01M 8/0247
429/437

FOREIGN PATENT DOCUMENTS

| JP | 2003-229144 | 8/2003 |
| JP | 2008-293743 | 12/2008 |
| JP | 2011-054404 | 3/2011 |
| JP | 2012-138224 | 7/2012 |

* cited by examiner

*Primary Examiner* — Patrick Ryan
*Assistant Examiner* — Christopher Domone
(74) *Attorney, Agent, or Firm* — Mori & Ward, LLP

(57) ABSTRACT

A fuel cell stack includes a plurality of fuel cells each including a first separator, a second separator and a membrane electrode assembly. A first reactant gas manifold of the first separator has an elongated opening extending along a ridge line of a first buffer portion and has an end wall surface that is located at an end of the first reactant gas manifold of the first separator near a middle portion of the first buffer portion and that is a convex curved surface. The convex curved surface and the first buffer portion are connected to each other through a channel that is bent or curved.

12 Claims, 7 Drawing Sheets

FUEL CELL STACK

CROSS-REFERENCE TO RELATED APPLICATIONS

The present application claims priority under 35 U.S.C. §119 to Japanese Patent Application No. 2012-269279, filed Dec. 10, 2012, entitled "Fuel Cell Stack." The contents of this application are incorporated herein by reference in their entirety.

BACKGROUND

1. Field

The present disclosure relates to a fuel cell stack.

2. Description of the Related Art

For example, a solid polymer electrolyte fuel cell includes a unit cell including a membrane electrode assembly (MEA) and separators sandwiching the MEA therebetween. The MEA includes an electrolyte membrane made from a polymer ion-exchange membrane, an anode electrode disposed on one side of the electrolyte membrane, and a cathode electrode disposed on the other side of the electrolyte membrane. Typically, a predetermined number of unit cells of this type are stacked and used as a vehicle fuel cell stack.

In the fuel cell, a fuel gas channel is formed in a surface of one of the separators so as to supply a fuel gas toward the anode electrode and an oxidant gas channel is formed in a surface of the other separator so as to supply an oxidant gas toward the cathode electrode. Moreover, a coolant channel is formed between adjacent separators of adjacent fuel cells so that a coolant can flow along surfaces of the separators to a region in which the electrodes are disposed.

A fuel cell of this type is usually structured as a so-called internal-manifold-type fuel cell. The internal-manifold-type fuel cell has a fuel gas inlet manifold and a fuel gas outlet manifold, through which a fuel gas flows; an oxidant gas inlet manifold and an oxidant gas outlet manifold, through which an oxidant gas flows; and a coolant inlet manifold and a coolant outlet manifold, through which a coolant flows. All of these manifolds extend in the stacking direction of the unit cells.

However, internal-manifold-type fuel cells have a problem in that a reactant gas is nonuniformly supplied to the entire surface of the reactant gas channel from the reactant gas inlet manifold. Japanese Unexamined Patent Application Publication No. 2008-293743, for example, discloses a fuel cell to address this problem.

The fuel cell includes a membrane electrode assembly and a separator that are stacked, the membrane electrode assembly including an electrolyte membrane and a pair of electrodes sandwiching the electrolyte membrane therebetween; a reactant gas channel through which a reactant gas is supplied along a surface of each of the electrodes, and a reactant gas manifold through which the reactant gas flows in the stacking direction.

The separator includes an inlet buffer portion and a supply-side of the reactant gas manifold. The inlet buffer portion is located at an inlet side of the reactant gas channel, has a substantially triangular shape, and has a width substantially the same as the width of the reactant gas channel field. The supply-side of the reactant gas manifold is located near one of ridge lines of the inlet buffer portion. The inlet buffer portion has protrusions. The disposition density of the protrusions in a middle portion of the inlet buffer portion is lower than the disposition density of the protrusions in end portions of the inlet buffer portion.

The reactant gas easily passes through a middle portion of the inlet buffer portion in the width direction, and the disposition density of the protrusions is low in the middle portion of the inlet buffer portion. Therefore, the flow speed of the reactant gas decreases in the middle portion and the reactant gas can be guided to channel grooves in a middle portion of the reactant gas channel in the width direction.

SUMMARY

According to one aspect of the present invention, a fuel cell stack includes a plurality of fuel cells that are stacked. The plurality of fuel cells each includes a first separator, a second separator and a membrane electrode assembly. The first separator has a horizontally elongated shape with a long side and a short side. The second separator has a horizontally elongated shape with a long side and a short side. The membrane electrode assembly is provided between the first separator and the second separator in a stacking direction and includes a first electrode, a second electrode and an electrolyte membrane which is provided between the first electrode and the second electrode. Each of the first separator and the second separator includes, in a portion near the short side of each of the first separator and the second separator, a first reactant gas manifold and a second reactant gas manifold. A first reactant gas is to flow in the stacking direction through the first reactant gas manifold. The first reactant gas includes one of a fuel gas and an oxidant gas. Another of the fuel gas and the oxidant gas is to flow in the stacking direction through the second reactant gas manifold. The first separator includes a reactant gas channel, a first buffer portion, a second buffer portion and a plurality of connection channels. The first reactant gas is to flow through the reactant gas channel along a surface of the first separator and along the long side of the first separator. The first buffer portion is connected to one of an inlet side and an outlet side of the reactant gas channel and has a triangular shape. The second buffer portion is connected to another of the inlet side and the outlet side of the reactant gas channel and has a triangular shape. The plurality of connection channels connects the first reactant gas manifold of the first separator to the first buffer portion. The first reactant gas manifold of the first separator has an elongated opening extending along a ridge line of the first buffer portion and has an end wall surface that is located at an end of the first reactant gas manifold of the first separator near a middle portion of the first buffer portion and that is a convex curved surface. The convex curved surface and the first buffer portion are connected to each other through a channel that is bent or curved.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
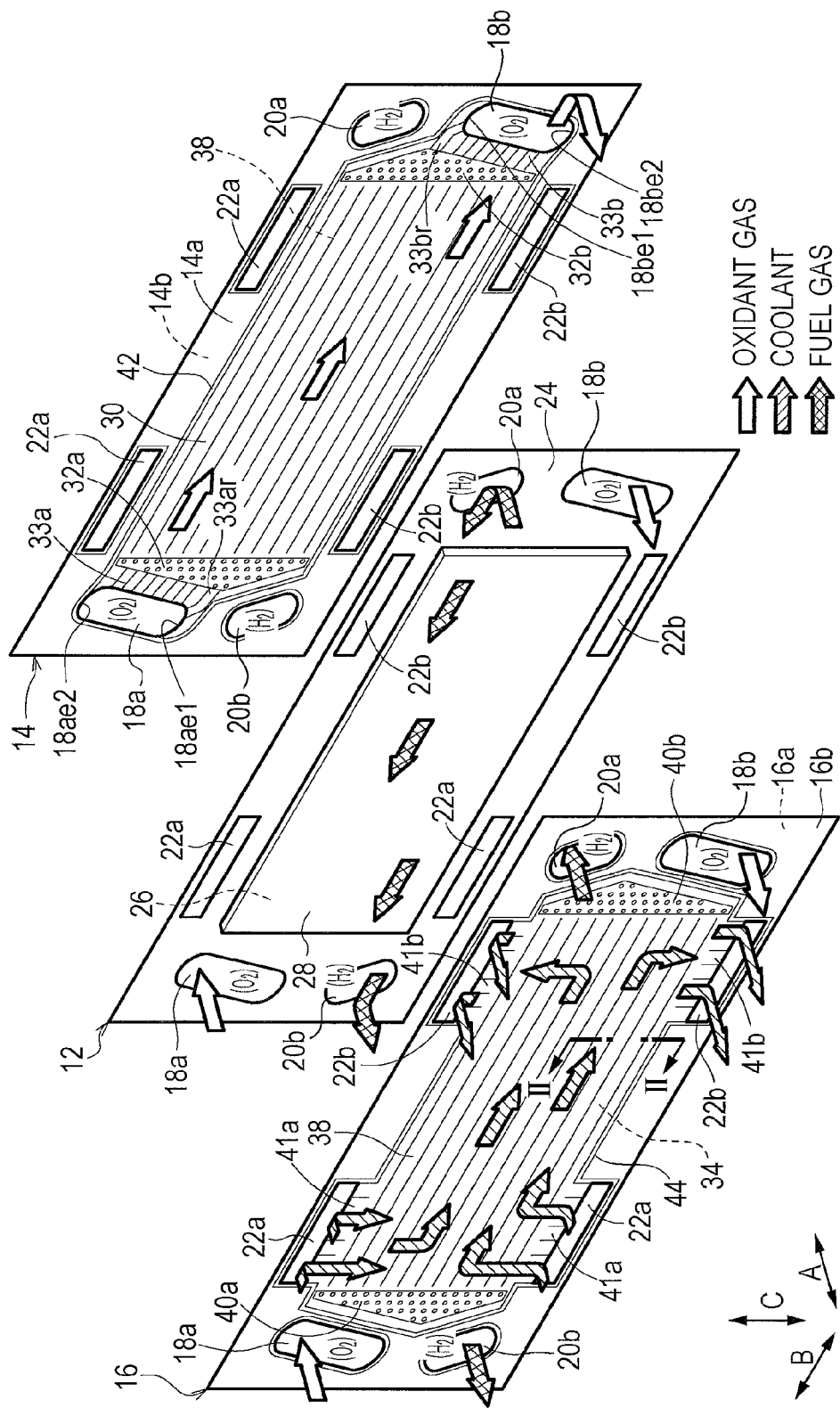
FIG. 1 is an exploded perspective view of a fuel cell of a fuel cell stack according to a first embodiment of the present disclosure.

The embodiments will now be described with reference to the accompanying drawings, wherein like reference numerals designate corresponding or identical elements throughout the various drawings.

Figure 2:
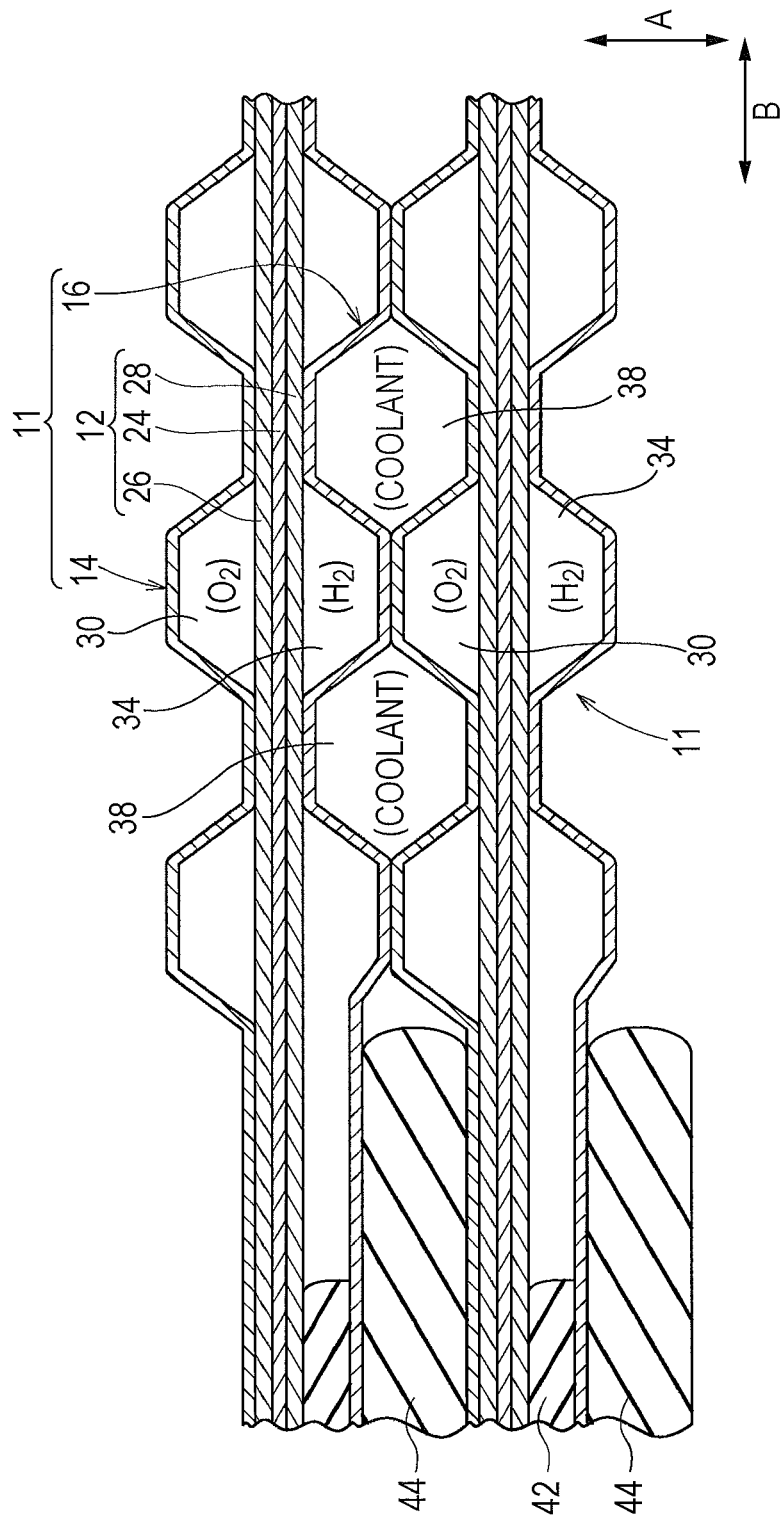
FIG. 2 is a sectional view of the fuel cell taken along line II-II in FIG. 1.

As illustrated in FIGS. 1 and 2, a fuel cell stack 10 according to a first embodiment of the present disclosure includes a plurality of fuel cells 11 that are arranged in upright positions (so that electrode surfaces thereof extend in the vertical direction) and that are stacked in the direction of arrow A. The fuel cells 11 each include a membrane electrode assembly 12, and a cathode separator 14 and an anode separator 16 sandwiching the membrane electrode assembly 12 therebetween.

The cathode separator 14 and the anode separator 16 are each a thin metal separator made from, for example, a steel plate, a stainless steel plate, an aluminum plate, a galvanized steel plate, or any of such metal plates having an anti-corrosive coating on the surface thereof. The metal separator is rectangular in plan view and has a corrugated form having an undulating cross-sectional shape. The corrugated form is made by press-forming a metal plate. The cathode separator 14 and the anode separator 16 need not be metal separators and may be, for example, carbon separators.

Each of the cathode separator 14 and the anode separator 16 has a horizontally elongated shape and has short sides extending in a vertical direction (direction of arrow C) and long sides extending in a horizontal direction (direction of arrow B) (so as to be stacked in a horizontal direction).

An oxidant gas inlet manifold 18a (first reactant gas manifold) and a fuel gas outlet manifold 20b (second reactant gas manifold) are formed in the fuel cell 11 so as to extend in the direction of arrow A through one end portion of the fuel cell 11 in the longitudinal direction (direction of arrow B). An oxidant gas, such as an oxygen-containing gas, is supplied through the oxidant gas inlet manifold 18a. A fuel gas, such as a hydrogen-containing gas, is discharged through the fuel gas outlet manifold 20b. Each of the oxidant gas inlet manifold 18a and the fuel gas outlet manifold 20b has an elongated opening (which may be substantially triangular). The opening of the oxidant gas inlet manifold 18a has an area larger than that of the fuel gas outlet manifold 20b.

A fuel gas inlet manifold 20a (second reactant gas manifold) and an oxidant gas outlet manifold 18b (first reactant gas manifold) are formed in the fuel cell 11 so as to extend in the direction of arrow A through the other end portion of the fuel cell 11 in the longitudinal direction. The fuel gas is supplied through the fuel gas inlet manifold 20a. The oxidant gas is discharged through the oxidant gas outlet manifold 18b. Each of the oxidant gas outlet manifold 18b and the fuel gas inlet manifold 20a has an elongated opening (which may be substantially triangular). The opening of the oxidant gas outlet manifold 18b has an area larger than that of the fuel gas inlet manifold 20a.

A pair of coolant inlet manifolds 22a are formed in the fuel cell 11 so as to extend in the direction of arrow A through one end portions of the fuel cell 11 in the transversal direction (in the direction of arrow C). A coolant is supplied through the coolant inlet manifolds 22a. A pair of coolant outlet manifolds 22b are formed in the fuel cell 11 so as to extend through the other end portions of the fuel cell 11 in the transversal direction. The coolant is discharged through the coolant outlet manifolds 22b.

Each of the coolant inlet manifolds 22a has an elongated substantially rectangular opening extending along a coolant channel 38 (in the direction of arrow B). Each of the coolant outlet manifolds 22b has an elongated substantially rectangular opening extending along the coolant channel 38 (in the direction of arrow B).

The membrane electrode assembly 12 includes a solid polymer electrolyte membrane 24, and a cathode electrode 26 and an anode electrode 28 sandwiching the solid polymer electrolyte membrane 24 therebetween. The solid polymer electrolyte membrane 24 is made of, for example, a fluoropolymer or a hydrocarbon polymer.

Each of the cathode electrode 26 and the anode electrode 28 includes a gas diffusion layer (not shown) and an electrode catalyst layer (not shown). The gas diffusion layer is made of carbon paper or the like. The electrode catalyst layer is formed on a surface of the gas diffusion layer by uniformly coating the surface with porous carbon particles whose surfaces support a platinum alloy. The electrode catalyst layers are formed on both sides of the solid polymer electrolyte membrane 24.

Figure 3:
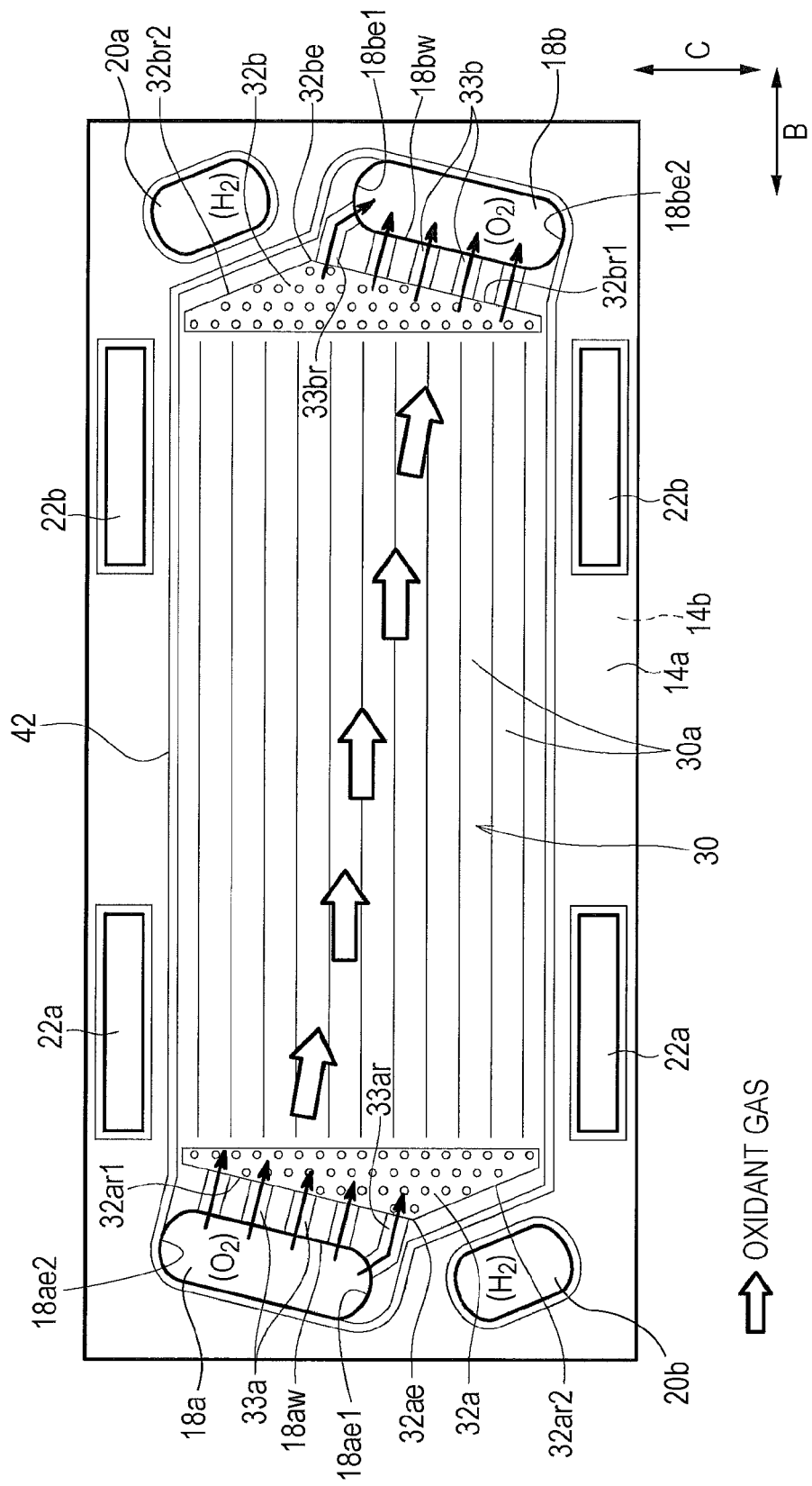
FIG. 3 is a plan view of a cathode separator of the fuel cell.

As illustrated in FIG. 3, an oxidant gas channel 30, through which the oxidant gas inlet manifold 18a is connected to the oxidant gas outlet manifold 18b, is formed on a surface 14a of the cathode separator 14 facing the membrane electrode assembly 12. The oxidant gas channel 30 includes a plurality of linear or wave-shaped channel grooves 30a extending in the horizontal direction (direction of arrow B). The oxidant gas flows through the channel grooves 30a along a separator surface in the longitudinal direction.

An inlet buffer portion 32a and an outlet buffer portion 32b are respectively disposed in the vicinities of the inlet and the outlet of the oxidant gas channel 30. Each of the buffer portions 32a and 32b has a plurality of embossed portions. The inlet buffer portion 32a and the outlet buffer portion 32b have a function of regulating the flow of the oxidant gas and making the oxidant gas flow uniformly along the oxidant gas channel 30. The inlet buffer portion 32a has a substantially triangular shape having sides corresponding to the shapes of the oxidant gas inlet manifold 18a and the fuel gas outlet manifold 20b. The position of a vertex 32ae of the triangular shape is located below the center of the inlet buffer portion 32a in the height direction (direction of arrow C).

The inlet buffer portion 32a has a first ridge line 32ar1 facing the oxidant gas inlet manifold 18a and a second ridge line 32ar2 facing the fuel gas outlet manifold 20b. The first ridge line 32ar1 is longer than the second ridge line 32ar2. The first ridge line 32ar1 is parallel to a wall surface 18aw of the oxidant gas inlet manifold 18a facing the inlet buffer portion 32a.

The outlet buffer portion 32b has a substantially triangular shape having sides corresponding to the shapes of the oxidant gas outlet manifold 18b and the fuel gas inlet manifold 20a. The position of a vertex 32be of the triangular shape is located above the center of the outlet buffer portion 32b in the height direction (direction of arrow C). The outlet buffer portion 32b has a first ridge line 32br1 facing the oxidant gas outlet manifold 18b and a second ridge line 32br2 facing the fuel gas inlet manifold 20a. The first ridge line 32br1 is longer than the second ridge line 32br2. The first ridge line 32br1 is parallel to a wall surface 18bw of the oxidant gas outlet manifold 18b facing the outlet buffer portion 32b.

The inlet buffer portion 32a is connected to the oxidant gas inlet manifold 18a through a plurality of inlet connection channels 33a. The outlet buffer portion 32b is connected to the oxidant gas outlet manifold 18b through a plurality of outlet connection channels 33b.

The oxidant gas inlet manifold 18a has an end wall surface 18ae1 at an end thereof near a middle portion of the inlet buffer portion 32a (near the vertex 32ae). The end wall surface 18ae1 is a convex curved surface, such as an arc surface. The end wall surface 18ae1, which is a curved surface, is connected to the inlet buffer portion 32a through an inlet bent channel 33ar (or a curved channel). The inlet bent channel 33ar is connected to the inlet buffer portion 32a in a direction parallel to the inlet connection channels 33a. The inlet bent channel 33ar is bent (or curved) in a middle portion thereof and is connected to the end wall surface 18ae1.

The oxidant gas outlet manifold 18b has an end wall surface 18be1 at an end thereof near a middle portion of the outlet buffer portion 32b (near the vertex 32be). The end wall surface 18be1 is a convex curved surface, such as an arc surface. The end wall surface 18be1, which is a curved surface, is connected to the outlet buffer portion 32b through an outlet bent channel 33br (or a curved channel). The outlet bent channel 33br is connected to the outlet buffer portion 32b in a direction parallel to the outlet connection channels 33b. The outlet bent channel 33br is bent (or curved) in a middle portion thereof and is connected to the end wall surface 18be1.

Figure 4:
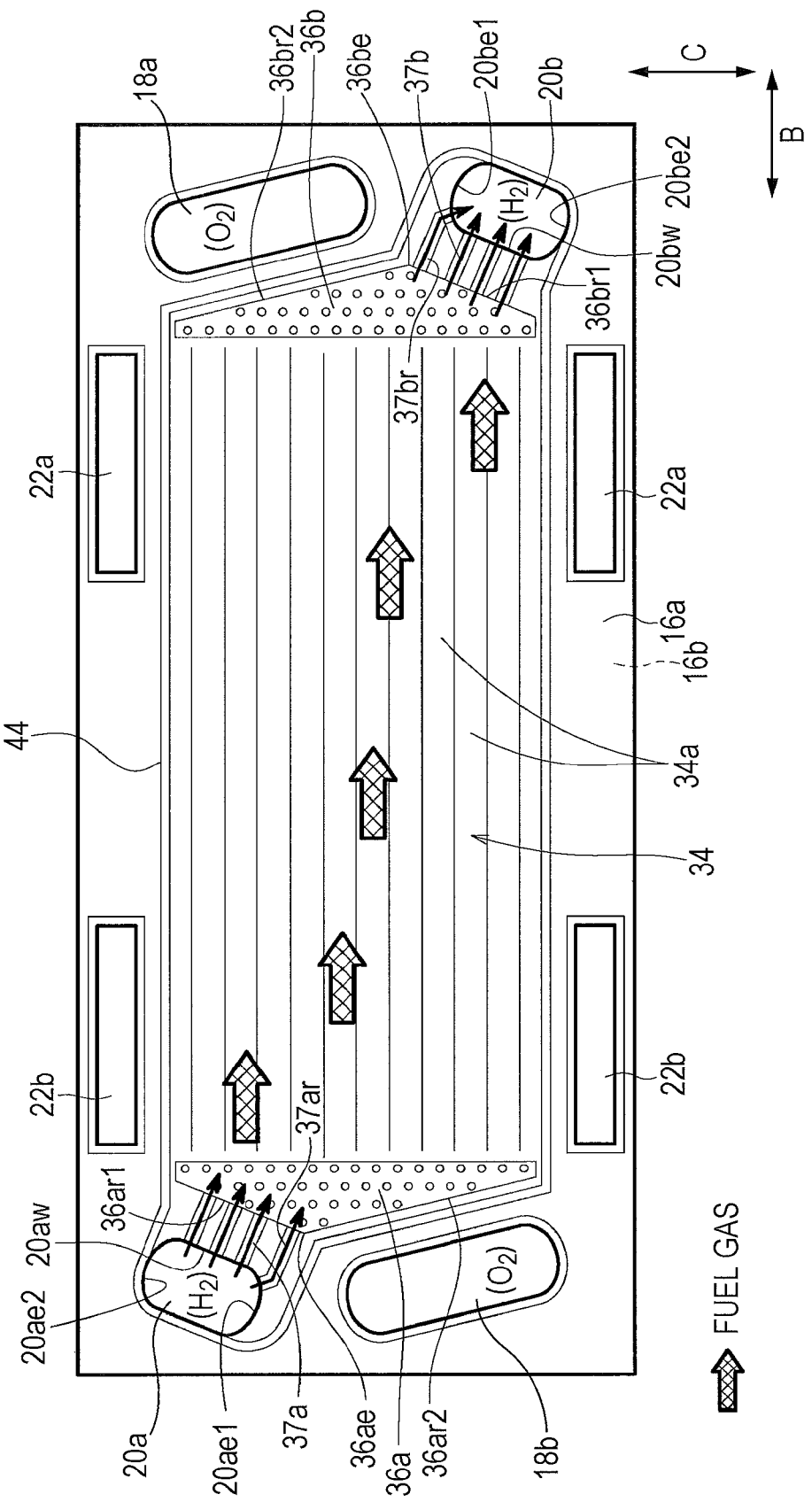
FIG. 4 is a plan view of an anode separator of the fuel cell.

As illustrated in FIG. 4, a fuel gas channel 34, through which the fuel gas inlet manifold 20a is connected to the fuel gas outlet manifold 20b, is formed on a surface 16a of the anode separator 16 facing the membrane electrode assembly 12. The fuel gas channel 34 includes a plurality of linear or wave-shaped channel grooves 34a extending in the horizontal direction (direction of arrow B). The fuel gas flows through the fuel gas channel 34 along a separator surface in the longitudinal direction. An inlet buffer portion 36a and an outlet buffer portion 36b are respectively disposed in the vicinities of the inlet and the outlet of the fuel gas channel 34. Each of the buffer portions 36a and 36b has a plurality of embossed portions.

The inlet buffer portion 36a has a substantially triangular shape having sides corresponding to the shapes of the fuel gas inlet manifold 20a and the oxidant gas outlet manifold 18b. The position of a vertex 36ae of the triangular shape is located above the center of the inlet buffer portion 36a in the height direction (direction of arrow C).

The inlet buffer portion 36a has a first ridge line 36ar1 facing the fuel gas inlet manifold 20a and a second ridge line 36ar2 facing the oxidant gas outlet manifold 18b. The first ridge line 36ar1 is longer than the second ridge line 36ar2. The first ridge line 36ar1 is parallel to a wall surface 20aw of the fuel gas inlet manifold 20a facing the inlet buffer portion 36a.

The outlet buffer portion 36b has a substantially triangular shape having sides corresponding to the shapes of the fuel gas outlet manifold 20b and the oxidant gas inlet manifold 18a. The position of a vertex 36be of the triangular shape is located below the center of the outlet buffer portion 36b in the height direction (direction of arrow C). The outlet buffer portion 36b has a first ridge line 36br1 facing the fuel gas outlet manifold 20b and a second ridge line 36br2 facing the oxidant gas inlet manifold 18a. The first ridge line 36br1 is shorter than the second ridge line 36br2. The first ridge line 36br1 is parallel to a wall surface 20bw of the fuel gas outlet manifold 20b facing the outlet buffer portion 36b.

The inlet buffer portion 36a is connected to the fuel gas inlet manifold 20a through a plurality of inlet connection channels 37a. The outlet buffer portion 36b is connected to the fuel gas outlet manifold 20b through a plurality of outlet connection channels 37b.

The fuel gas inlet manifold 20a has an end wall surface 20ae1 at an end thereof near a middle portion of the inlet buffer portion 36a (near the vertex 36ae). The end wall surface 20ae1 is a convex curved surface, such as an arc surface. The end wall surface 20ae1, which is a curved surface, is connected to the inlet buffer portion 36a through an inlet bent channel 37ar (or a curved channel). The inlet bent channel 37ar is connected to the inlet buffer portion 36a in a direction parallel to the inlet connection channels 37a. The inlet bent channel 37ar is bent (or curved) in a middle portion thereof and is connected to the end wall surface 20ae1.

The fuel gas outlet manifold 20b has an end wall surface 20be1 at an end thereof near a middle portion of the outlet buffer portion 36b (near the vertex 36be). The end wall surface 20be1 is a convex curved surface, such as an arc surface. The end wall surface 20be1, which is a curved surface, is connected to the outlet buffer portion 36b through an outlet bent channel 37br (or a curved channel). The outlet bent channel 37br is connected to the outlet buffer portion 36b in a direction parallel to the outlet connection channels 37b. The outlet bent channel 37br is bent (or curved) in a middle portion thereof and is connected to the end wall surface 20be1.

As illustrated in FIG. 1, the coolant channel 38 is formed between a surface 16b of the anode separator 16 and a surface 14b of the cathode separator 14 of an adjacent fuel cell 11. The coolant channel 38 is connected to the pair of coolant inlet manifolds 22a and to the pair of coolant outlet manifolds 22b. Along the coolant channel 38, the coolant flows over the area of the membrane electrode assembly 12 corresponding to the electrodes. An inlet buffer portion 40a and an outlet buffer portion 40b are respectively disposed in the vicinities of the inlet and the outlet of the coolant channel 38.

In the anode separator 16, the coolant channel 38 is formed on the back side of the fuel gas channel 34. The inlet buffer portion 40a and the outlet buffer portion 40b are respectively formed on the back sides of the outlet buffer portion 36b and the inlet buffer portion 36a. In the cathode separator 14, the coolant channel 38 is formed on the back side of the oxidant gas channel 30. The inlet buffer portion 40a and the outlet buffer portion 40b are respectively formed on the back sides of the inlet buffer portion 32a and the outlet buffer portion 32b.

A plurality of inlet connection channels 41a are disposed in the vicinity of the coolant inlet manifolds 22a, and a plurality of outlet connection channels 41b are disposed in the vicinity of the coolant outlet manifolds 22b.

On the surfaces 14a and 14b of the cathode separator 14, a first sealing member 42 is integrally formed around the outer periphery of the cathode separator 14. On the surfaces 16a and 16b of the anode separator 16, a second sealing member 44 is integrally formed around the outer periphery of the anode separator 16. Each of the first sealing member 42 and the second sealing member 44 is made from an elastic material such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

The operation of the fuel cell 11 will be described below.

First, as illustrated in FIG. 1, an oxidant gas, such as an oxygen-containing gas, is supplied to the oxidant gas inlet manifold 18a. A fuel gas, such as a hydrogen-containing gas, is supplied to the fuel gas inlet manifold 20a. A coolant, such as pure water, ethylene glycol, a cooling oil, or the like, is supplied to the pair of coolant inlet manifolds 22a.

As illustrated in FIGS. 1 and 3, the oxidant gas flows through the oxidant gas inlet manifold 18a, the inlet connection channels 33a, and the inlet buffer portion 32a; and the oxidant gas is introduced into the oxidant gas channel 30 of the cathode separator 14. The oxidant gas moves along the oxidant gas channel 30 in the direction of arrow B (horizontal direction), and is supplied to the cathode electrode 26 of the membrane electrode assembly 12.

As illustrated in FIG. 4, the fuel gas passes through the fuel gas inlet manifold 20a, the inlet connection channels 37a, and the inlet buffer portion 36a; and the fuel gas is supplied to the fuel gas channel 34 of the anode separator 16. The fuel gas moves along the fuel gas channel 34 in the horizontal direction (direction of arrow B), and is supplied to the anode electrode 28 of the membrane electrode assembly 12 (see FIG. 1).

Accordingly, in the membrane electrode assembly 12, the oxidant gas supplied to the cathode electrode 26 and the fuel gas supplied to the anode electrode 28 are consumed in electrochemical reactions in the electrode catalyst layers, and thereby electric power is generated.

As illustrated in FIGS. 1 and 3, the oxidant gas, which has been supplied to the cathode electrode 26 of the membrane electrode assembly 12 and consumed, passes through the outlet buffer portion 32b and the outlet connection channels 33b, and is discharged along the oxidant gas outlet manifold 18b in the direction of arrow A. As illustrated in FIG. 4, the fuel gas, which has been supplied to the anode electrode 28 of the membrane electrode assembly 12 and consumed, passes through the outlet buffer portion 36b and the outlet connection channels 37b, and is discharged along the fuel gas outlet manifold 20b in the direction of arrow A.

The coolant supplied to the pair of coolant inlet manifolds 22a is introduced into the coolant channel 38 between the cathode separator 14 and the anode separator 16. As illustrated in FIG. 1, the coolant temporarily flows inward in the direction of arrow C (vertical direction), then moves in the direction of arrow B (horizontal direction), and cools the membrane electrode assembly 12. The coolant moves outward in the direction of arrow C and is discharged to the pair of coolant outlet manifolds 22b.

As illustrated in FIG. 3, in the first embodiment, the oxidant gas inlet manifold 18a has an elongated opening (which may be substantially triangular). The end wall surface 18ae1 at an end of the oxidant gas inlet manifold 18a near a middle portion of the inlet buffer portion 32a (near the vertex 32ae). The end wall surface 18ae1, which is a curved surface, is connected to the inlet buffer portion 32a through the inlet bent channel 33ar.

By using a structure (Comparative Example) in which the inlet bent channel 33ar is not formed in the end wall surface 18ae1 of the oxidant gas inlet manifold 18a and a structure (Example) according to the present disclosure, the distribution of the oxidant gas supplied to the oxidant gas channel 30 is compared. With the structure of Comparative Example, the pressure loss in a middle portion of the inlet buffer portion 32a tends to become larger than the pressure loss at end portions of the inlet buffer portion 32a.

Figure 5:
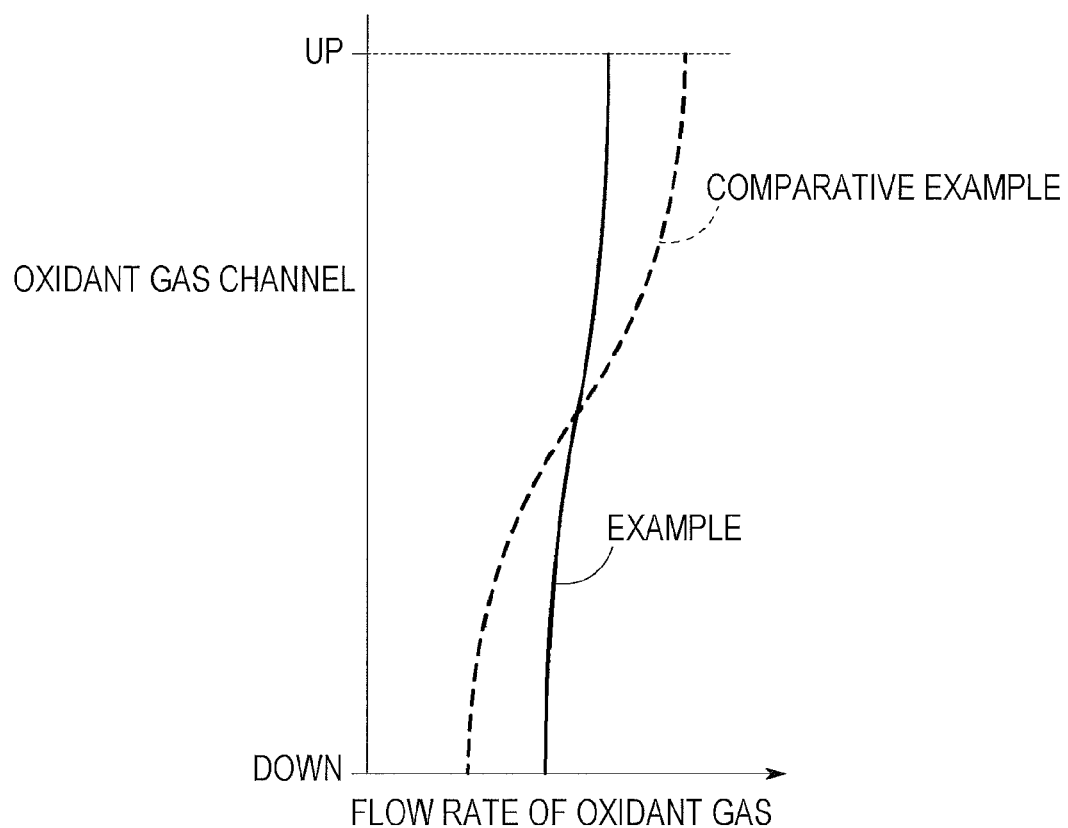
FIG. 5 is a graph illustrating a comparison of the flow rate of an oxidant gas supplied to an oxidant gas channel of an example according to the present disclosure and a comparative example.

Therefore, a large amount of oxidant gas flows from the oxidant gas inlet manifold 18a into an end portion (upper end portion) of the inlet buffer portion 32a. As a result, as illustrated in FIG. 5, the flow rate of oxidant gas in a lower portion of the inlet buffer portion 32a becomes low. Therefore, a problem occurs in that the oxidant gas is nonuniformly supplied to the power generation region, and therefore durability and power generation stability deteriorate.

In contrast, with the structure of Example, in the oxidant gas inlet manifold 18a, the end wall surface 18ae1, which is a curved surface, is connected to the inlet buffer portion 32a through the inlet bent channel 33ar. Therefore, in the oxidant gas inlet manifold 18a, the pressure loss at a position near the end wall surface 18ae1 of the inlet buffer portion 32a is smaller than the pressure loss at a position near an end portion of the inlet buffer portion 32a.

Figure 6:
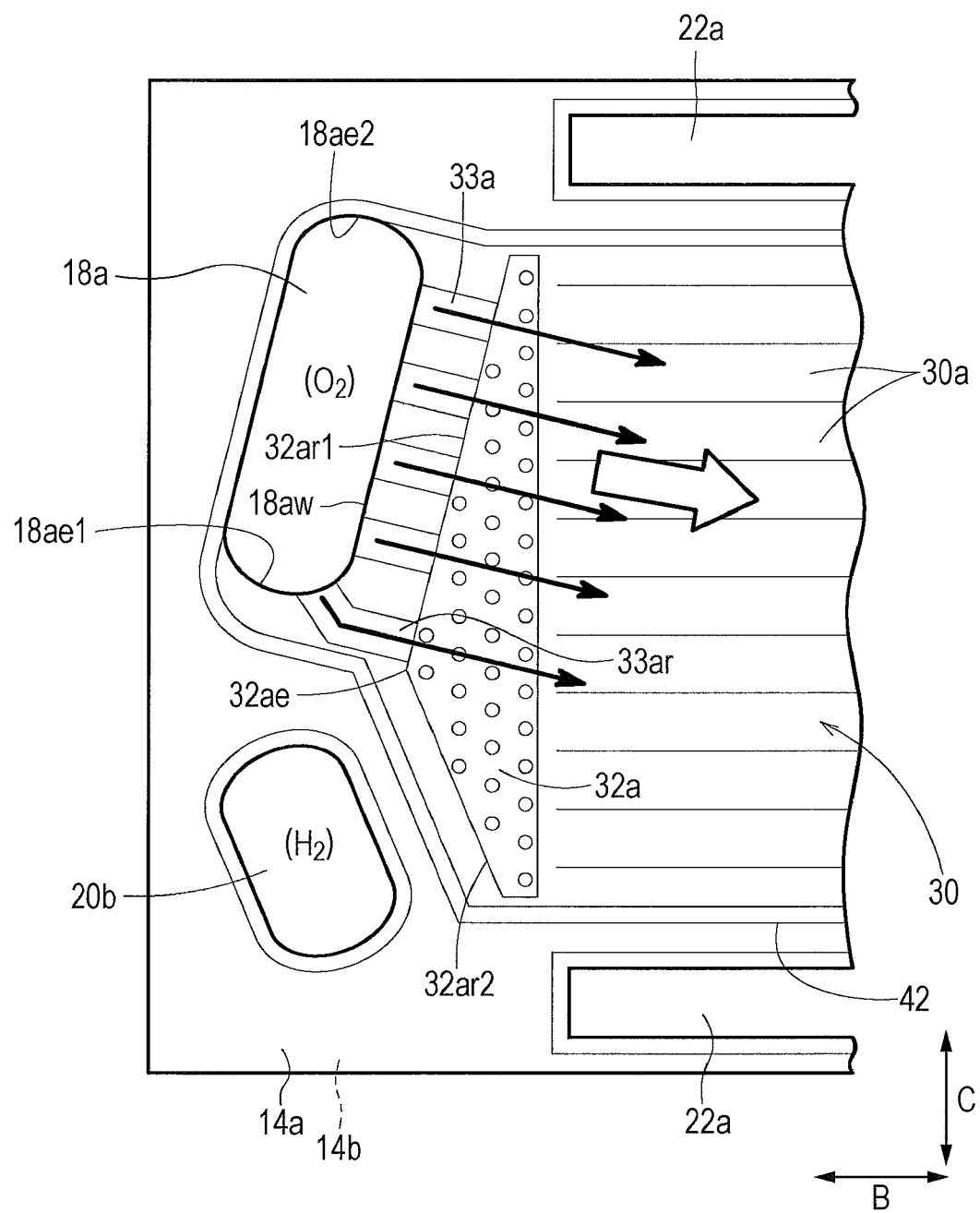
FIG. 6 is a partial view illustrating an oxidant gas inlet manifold of the fuel cell.

Thus, as illustrated in FIG. 6, the oxidant gas flows through the oxidant gas inlet manifold 18a, the inlet connection channels 33a, and the inlet bent channel 33ar so that the flow rate of the oxidant gas at a middle portion of the inlet buffer portion 32a, at which flow of the oxidant gas tends to slow down, becomes higher than that at an upper end portion of the inlet buffer portion 32a.

Therefore, with a simple and economical structure, the oxidant gas can be uniformly and reliably supplied to the entire area of the oxidant gas channel 30 in the width direction, and a desired power generation performance can be achieved.

Because the structure on the oxidant gas outlet manifold 18b is the same as that of the oxidant gas inlet manifold 18a side, the same effect can be obtained with the structure. As illustrated in FIG. 4, the fuel gas channel 34 has a structure similar to that of the oxidant gas channel 30. Therefore, the fuel gas channel 34 provides the same effect as that of the oxidant gas channel 30.

In the first embodiment, each of the fuel cells 11 includes a single MEA (the membrane electrode assembly 12) and two separators (the cathode separator 14 and the anode separator 16). However, the number of MEAs and the number of separators are not limited to these. For example, each fuel cell may include two MEAs and three separators (each MEA being interposed between two of the three separators), and the structure according to the first embodiment may be used for a coolant that flows between such fuel cells.

Figure 7:
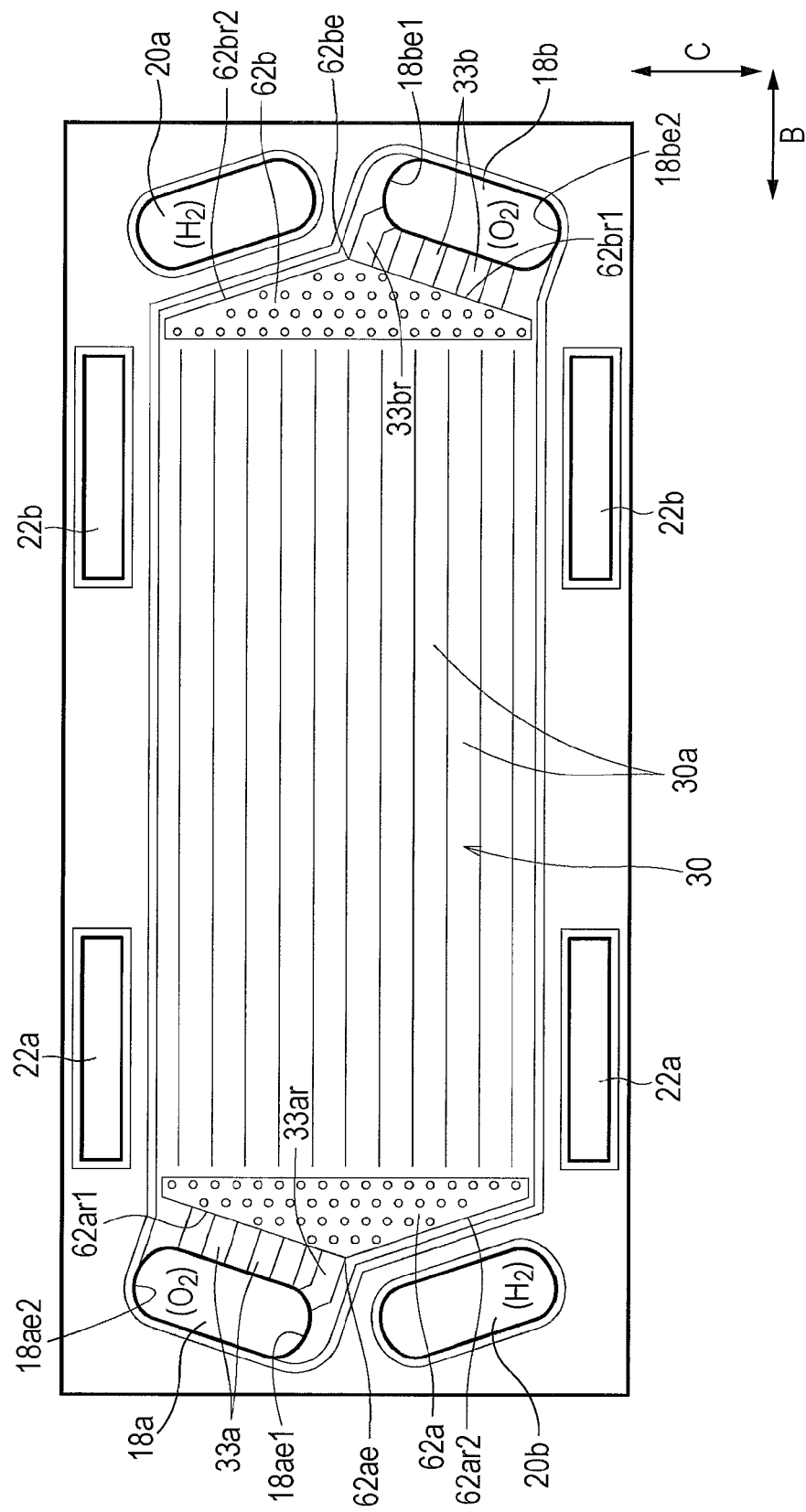
FIG. 7 is a plan view of a cathode separator of a fuel cell stack according to a second embodiment of the present disclosure.

FIG. 7 is a plan view of a cathode separator 60 of a fuel cell stack according to a second embodiment of the present disclosure. The elements the same as those of the cathode separator 14 of the fuel cell stack 10 according to the first embodiment will be denoted by the same numerals and detailed description thereof will be omitted.

In the second embodiment, the oxidant gas inlet manifold 18a and the fuel gas outlet manifold 20b have elongated openings (which may be substantially triangular) that have substantially the same opening area. The oxidant gas outlet manifold 18b and the fuel gas inlet manifold 20a have elongate shapes (which may be substantially triangular) and have substantially the same opening area.

In the cathode separator 60, an inlet buffer portion 62a and an outlet buffer portion 62b are respectively disposed in the vicinities of the inlet and the outlet of the oxidant gas channel 30. The inlet buffer portion 62a has a triangular shape having sides corresponding to the shapes of the oxidant gas inlet manifold 18a and the fuel gas outlet manifold 20b. A first ridge line 62ar1 facing the oxidant gas inlet manifold 18a and a second ridge line 62ar2 facing the fuel gas outlet manifold 20b have the same length.

The outlet buffer portion 62b has a triangular shape having sides corresponding to the shapes of the oxidant gas outlet manifold 18b and the fuel gas inlet manifold 20a. A first ridge line 62br1 facing the oxidant gas outlet manifold 18b and a second ridge line 62br2 facing the fuel gas inlet manifold 20a have the same length.

The oxidant gas inlet manifold 18a has an end wall surface 18ae1 at an end thereof near a middle portion of the inlet buffer portion 62a. The end wall surface 18ae1 is a convex curved surface. The end wall surface 18ae1, which is a curved surface, is connected to the inlet buffer portion 62a through an inlet bent channel 33ar. The oxidant gas outlet manifold 18b has an end wall surface 18be1 at an end thereof near a middle portion of the outlet buffer portion 62b. The end wall surface 18be1 is a convex curved surface. The end wall surface 18be1, which is a curved surface, is connected to the outlet buffer portion 62b through the outlet bent channel 33br.

With the second embodiment, the flow rate of the oxidant gas supplied to a middle portion of the inlet buffer portion 62a is higher than the flow rate of the oxidant gas supplied to an upper end portion of the inlet buffer portion 62a. Therefore, with a simple and economical structure, the second embodiment has the same effect as that of the first embodiment. For example, the oxidant gas can be uniformly and reliably supplied to the entire area of the oxidant gas channel 30, and a desired power generation performance can be achieved.

According to an aspect of the embodiment, a fuel cell stack includes a plurality of fuel cells that are stacked, the fuel cells each including a membrane electrode assembly and a pair of separators that are stacked, the membrane electrode assembly including an electrolyte membrane and a pair of electrodes sandwiching the electrolyte membrane therebetween, the separators each having a horizontally elongated shape. The separators each include, in a portion thereof near a short side thereof, a first reactant gas manifold through which a first reactant gas, which is one of a fuel gas and an oxidant gas, flows in a stacking direction in which the separators are stacked, and a second reactant gas manifold through which the other of the fuel gas and the oxidant gas flows in the stacking direction in which the separators are stacked.

In the fuel cell stack according to the embodiment, one of the separators includes a reactant gas channel through which the first reactant gas flows along a surface of the separator along a long side of the separator, a buffer portion connected to an inlet side of the reactant gas channel and a buffer portion connected to an outlet side of the reactant gas channel, the buffer portions each having a triangular shape, and a plurality of connection channels connecting the first reactant gas manifold to one of the buffer portions.

Moreover, the first reactant gas manifold has an elongated opening extending along a ridge line of the one of the buffer portions and has an end wall surface that is located at an end of the first reactant gas manifold near a middle portion of the buffer portion and that is a convex curved surface, and the curved surface and the buffer portion are connected to each other through a channel that is bent or curved.

In the fuel cell stack according to the embodiment, it is preferable that the first reactant gas manifold have a wall surface that is located near the one of the buffer portions and in which the plurality of connection channels have openings, the wall surface extending parallel to the ridge line of the buffer portion.

According to the aspect of the embodiment, the first reactant gas manifold has an elongated opening and the end wall surface of the first reactant gas manifold near a middle portion of the buffer portion is a convex curved surface. Therefore, the pressure loss in the vicinity of the end wall surface can be effectively reduced. Moreover, the curved surface is connected to the buffer portion through a channel that is bent or curved. Therefore, the reactant gas can smoothly flow through the channel from the vicinity of the end wall surface of the first reactant gas manifold.

Thus, the flow rate of the reactant gas supplied to a middle portion of the buffer portion, in which flow of the reactant gas tends to slow down, can be effectively increased. Therefore, the reactant gas can be smoothly supplied to the entirety of the reactant gas channel.

Therefore, the reactant gas can be uniformly and reliably supplied to the entire surface of the reactant gas channel, and thereby a desired power generation performance can be achieved with a simple and economical structure.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
a plurality of fuel cells that are stacked, the plurality of fuel cells each comprising:
   a first separator having a horizontally elongated shape with a long side and a short side;
   a second separator having a horizontally elongated shape with a long side and a short side; and
   a membrane electrode assembly provided between the first separator and the second separator in a stacking direction and including a first electrode, a second electrode and an electrolyte membrane which is provided between the first electrode and the second electrode,
wherein each of the first separator and the second separator includes, in a portion adjacent to the short side of each of the first separator and the second separator,
   a first reactant gas manifold through which a first reactant gas is to flow in the stacking direction, the first reactant gas comprising one of a fuel gas and an oxidant gas, and
   a second reactant gas manifold through which another of the fuel gas and the oxidant gas is to flow in the stacking direction,
wherein the first separator includes
   a reactant gas channel through which the first reactant gas is to flow along a surface of the first separator and along the long side of the first separator,
   a first buffer portion connected to one of an inlet side and an outlet side of the reactant gas channel and having a triangular shape,
   a second buffer portion connected to another of the inlet side and the outlet side of the reactant gas channel and having a triangular shape, and
   a plurality of connection channels connecting the first reactant gas manifold of the first separator to the first buffer portion,
wherein the first reactant gas manifold of the first separator has an elongated opening extending along a ridge line of the first buffer portion and has an end wall surface that is located at an end of the first reactant gas manifold of the first separator adjacent to a middle portion of the first buffer portion and that is a convex curved surface, and
wherein the convex curved surface and the first buffer portion are connected to each other through a channel that is curved.

2. The fuel cell stack according to claim 1,
wherein the first reactant gas manifold has a wall surface which is located adjacent to the first buffer portion and to which the plurality of connection channels are connected, the wall surface extending parallel to the ridge line of the first buffer portion.

3. The fuel cell stack according to claim 1,
wherein the second reactant gas manifold of the first separator has an elongated opening extending along an another ridge line of the first buffer portion.

4. A fuel cell stack comprising:
a plurality of fuel cells that are stacked, the plurality of fuel cells each comprising:
   a first separator having a horizontally elongated shape with a long side and a short side;

a second separator having a horizontally elongated shape with a long side and a short side; and a membrane electrode assembly provided between the first separator and the second separator in a stacking direction and including a first electrode, a second electrode and an electrolyte membrane which is provided between the first electrode and the second electrode, wherein each of the first separator and the second separator includes, in a portion adjacent to the short side of each of the first separator and the second separator, a first reactant gas manifold through which a first reactant gas is to flow in the stacking direction, the first reactant gas comprising one of a fuel gas and an oxidant gas, and a second reactant gas manifold through which another of the fuel gas and the oxidant gas is to flow in the stacking direction, wherein the first separator includes a reactant gas channel through which the first reactant gas is to flow along a surface of the first separator and along the long side of the first separator, a first buffer portion connected to one of an inlet side and an outlet side of the reactant gas channel and having a triangular shape, a second buffer portion connected to another of the inlet side and the outlet side of the reactant gas channel and having a triangular shape, and a plurality of connection channels connecting the first reactant gas manifold of the first separator to the first buffer portion, wherein the first reactant gas manifold of the first separator has an elongated opening extending along a ridge line of the first buffer portion and has an end wall surface that is located at an end of the first reactant gas manifold of the first separator adjacent to a middle portion of the first buffer portion and that is a convex curved surface, and wherein the first buffer portion and the convex curved surface are connected to each other through a channel that includes a first portion and a second portion that is bent with respect to the first portion.

5. The fuel cell stack according to claim 4,
wherein the first portion of the channel extends parallel to the plurality of connection channels, and
wherein the second portion of the channel extends at an angle with respect to the plurality of connection channels.

6. The fuel cell stack according to claim 5,
wherein the first portion of the channel is directly connected to the first buffer portion and the second portion of the channel is directly connected to the convex curved surface.

7. The fuel cell stack according to claim 4,
wherein the first portion of the channel is directly connected to the first buffer portion and the second portion of the channel is directly connected to the convex curved surface.

8. The fuel cell stack according to claim 4,
wherein the first reactant gas manifold has a wall surface which is located adjacent to the first buffer portion and to which the plurality of connection channels are connected, the wall surface extending parallel to the ridge line of the first buffer portion.

9. The fuel cell stack according to claim 4,
wherein the second reactant gas manifold of the first separator has an elongated opening extending along an another ridge line of the first buffer portion.

10. A fuel cell stack comprising:
a plurality of fuel cells that are stacked, the plurality of fuel cells each comprising:
a first separator having a horizontally elongated shape with a long side and a short side;
a second separator having a horizontally elongated shape with a long side and a short side; and
a membrane electrode assembly provided between the first separator and the second separator in a stacking direction and including a first electrode, a second electrode and an electrolyte membrane which is provided between the first electrode and the second electrode,
wherein each of the first separator and the second separator includes, in a portion adjacent to the short side of each of the first separator and the second separator,
a first reactant gas manifold through which a first reactant gas is to flow in the stacking direction, the first reactant gas comprising one of a fuel gas and an oxidant gas, and
a second reactant gas manifold through which another of the fuel gas and the oxidant gas is to flow in the stacking direction,
wherein the first separator includes
a reactant gas channel through which the first reactant gas is to flow along a surface of the first separator and along the long side of the first separator,
a first buffer portion connected to one of an inlet side and an outlet side of the reactant gas channel and having a triangular shape,
a second buffer portion connected to another of the inlet side and the outlet side of the reactant gas channel and having a triangular shape, and
a plurality of connection channels connecting the first reactant gas manifold of the first separator to the first buffer portion,
wherein the first reactant gas manifold of the first separator has an elongated opening extending along a ridge line of the first buffer portion and has an end wall surface that is located at an end of the first reactant gas manifold of the first separator adjacent to a middle portion of the first buffer portion and that is a convex curved surface, and
wherein the convex curved surface and the first buffer portion are connected to each other through a channel that is bent or curved, the channel being directly connected to the convex curved surface.

11. The fuel cell stack according to claim 10,
wherein the first reactant gas manifold has a wall surface which is located adjacent to the first buffer portion and to which the plurality of connection channels are connected, the wall surface extending parallel to the ridge line of the first buffer portion.

12. The fuel cell stack according to claim 10,
wherein the second reactant gas manifold of the first separator has an elongated opening extending along an another ridge line of the first buffer portion.

* * * * *